United States Patent [19]

Horvei

[11] Patent Number: 4,727,901

[45] Date of Patent: Mar. 1, 1988

[54] BALL VALVE

[75] Inventor: Knut Horvei, Sandnes, Norway

[73] Assignee: Den Norske Stats Oljeselskap A.S., Norway

[21] Appl. No.: 25,007

[22] Filed: Mar. 12, 1987

[30] Foreign Application Priority Data

Mar. 12, 1986 [NO] Norway .................................. 860923

[51] Int. Cl.[4] ........................ F16K 43/00; F16K 25/00
[52] U.S. Cl. .................................. 137/315; 137/454.6;
251/58; 251/159; 251/161; 251/164; 251/250;
251/292; 251/315
[58] Field of Search ................... 137/315, 454.5, 454.6;
251/58, 158, 159, 160, 161, 164, 165, 250, 264,
265, 315, 291, 266, 292, 274

[56] References Cited

U.S. PATENT DOCUMENTS

| | | | |
|---|---|---|---|
| 2,879,798 | 3/1959 | Anderson | 251/164 |
| 3,771,545 | 11/1973 | Allen | 137/315 |
| 3,901,474 | 8/1975 | Kubota | 251/159 |
| 3,934,606 | 1/1976 | Matthews | 251/159 |
| 4,151,855 | 5/1979 | Levin et al. | 137/315 |
| 4,175,577 | 11/1979 | Kacal et al. | 137/315 |
| 4,262,691 | 4/1981 | Kacal | 137/315 |
| 4,390,039 | 6/1983 | Johnson et al. | 137/315 |
| 4,506,864 | 3/1985 | Hartmann | 251/174 |
| 4,566,842 | 1/1986 | Stunkard | 137/315 |

Primary Examiner—George L. Walton
Attorney, Agent, or Firm—Lucas & Just

[57] ABSTRACT

A ball valve device for subsea applications, capable of being dismantled for inspection and maintenance without disrupting normal operations of the pipeline and without causing leakage into or out of the pipeline is disclosed. The ball arrangement of the valve has an upper ball member (3), and a lower ball member (4) in which its upper ball member (3), includes the main packings of the valve. The lower ball member (4) includes two axial withdrawable sleeves (13). When the valve is open, the sleeves (13) can be withdrawn outwardly for intervention with guiders in the valve housing (1) and thereby form a tight, continuous passageway which extends from one of the openings in said valve housing (1) to the second opening in said valve housing (1). The axial withdrawable sleeve (13) can be moved inwards to a position where it stands free from its other guiders when said ball arrangement rotates during closing of said valve.

7 Claims, 19 Drawing Figures

BALL VALVE

This invention relates to a ball valve for subsea applications and, more particularly, the type of valve intended to control the volume of fluid flow in a pipeline.

An object of this invention is to provide a ball valve which, when submerged in water, can be dismantled for inspection, overhauling, repair and replacement of the valve's vital parts without water penetrating into the subsea pipeline system to which this valve is connected or fluid leaking out of the pipeline system. This will, according to the present invention, be possible without the valve being covered or protected against the external medium by any additional means.

According to this invention, the ball valve is particularly intended for deep water employment offshore where access to the valve for necessary maintenance is difficult.

Up to now, shutdown and control valves in which vital parts are accessible for inspection, repair and replacement when in a submerged state, without water getting into the pipeline system during maintenance operations or fluid leaking out of the pipeline system have not been available for offshore installations. The only solution known has been to raise the entire ball valve to the sea surface or to build a tight compartment around the valve when carrying out maintenance. In terms of durability, today's ball valves appear to be quite vulnerable when subjected to the action of the medium flowing through the valve. When liquid containing large amounts of particles flow through the valve, particles tend to be forced into the valve's outer chamber where they deposit on the valve's vital parts; packings, packing seats, bearings, etc. This frequently causes the vital components to become damaged when operating the valve or, worst of all, causes the moveable parts of the valve to become clogged so that the valve becomes inoperable. During cleansing of pipeline systems, a scraper is forced through the pipeline and valves to clean the pipeline. These scrapers scrape loose and push ahead loose particles; rust, dirt, etc., which also may be forced into the valve's exterior chamber causing the same unfavorable deposits as previously described. Particles that are forced past packings and seats will also be capable of causing damage to vital valve components by erosion. If the flowing medium is corrosive, it will also have a damaging effect on the vital valve components.

Thus, known ball valves are limited by their operational safety and life span in certain mediums, and cannot usually be overhauled without special shut-off and by-pass operations and/or shutdown of the pipeline to which the valve is connected.

Expensive and complicated solutions do exist for the purpose at hand, but these are also drastically limited in terms of what they are capable of accomplishing. Such expensive and complicated solutions, belonging to the prior art, which are represented by Great Britain Pat. No. 1,216,989 and U.S. Pat. Nos. 2,663,538 and 4,175,577.

The British patent relates to fluid control valves which are withdrawably mounted within a sleeve which, in effect, constitutes a plug of a plug cock or so-called ball valve. Mutually locking elements are provided so that the withdrawable valve can only be withdrawn when the ball valve is in a closed position, the ends of the withdrawable valve being lodged in open ended slots in the sleeves to permit this. When the ball valve is open, the ends of the withdrawable valve fits into the ports in the valve housing.

This prior art fluid controlling valve includes a sealing member mounted in a casing for movement between a closed position in which said member closes a bore through the casing, and in open position in which said member allows fluid to flow through the casing bore. The casing is withdrawably mounted within a hollow sleeve member which is itself rotatably mounted in a canister for movement together with said casing between an open position in which ports in the sleeve are in level with a bore through the canister and a closed position in which the sleeve closes the canister bore. The casing can be withdrawn from said sleeve only when the latter is in said closed position. The canister bore has two seating rings disposed therein for cooperation respectively with the upstream and downstream ends of said sleeve, and the exterior surface of said sleeve has a partly spherical shape at least in the regions where it cooperates with said seating rings. This previously known valve is structurally complicated and expensive, and its functional regularity also seems doubtful. It has serious limitations and is hardly suitable for mounting at great depths offshore.

U.S. Pat. No. 2,663,538 relates to a ball valve for controlling fluid flow in onshore pipelines. The patent is particularly related to valves of relatively large capacity which, when closed, must be entirely or almost entirely liquid tight; and which, when open, must provide a relatively smooth passageway for the fluid flow in order to reduce hydraulic losses as much as possible. The spherical valve comprises a casing having an inlet and an outlet aligned on a longitudinal axis, a seat ring having a first sealing surface encompassing said outlet and disposed on said casing with its center displaced from said axis; a rotor journaled in said casing to turn about a transverse axis intersecting said longitudinal axis, and a rotor ring having a second sealing surface on said rotor adapted in one position of said rotor to abut said first sealing surface on said seat ring. This known spherical valve is obviously unsuitable for dismantling at great depths without taking special measures.

U.S Pat. No. 4,175,577 relates to a ball valve design which has a removable upper cover plate permitting the ball to be removed from the valve body. A separate cam tool, after removal of the cover plate, is positioned within the bore of the ball which has been partially rotated from the full open position, and upon a return rotation of the ball with the cam tool therein to a full open position, an adjacent spring urged seat ring is cammed away from the ball to a retracted position. A seat ring retainer is then actuated to hold the seat ring in the retracted position. The cam tool is then utilized in a similar manner to cam the other opposite seat ring in the retracted position. The ball may then be removed with the seat rings for replacement or repair as desired. The seat rings and seals thereon may in this way be removed and replaced without removal of the valve from the flowline in which the valve is mounted.

These previously known valves cannot be used either at great depths without extensive requirements to avoid the surrounding seawater penetrating into the pipeline to which the valve is connected, or the flowing medium (oil and/or gas) from leaking out of the pipeline during dismantling of the valve for inspection, overhauling, repair and change of components.

An object according to the present invention, therefore, is to provide a ball valve that preferably is intended for employment at great depths which, in a submerged position, is capable of being dismantled for inspection, overhauling, repair and replacement of the valve's vital components without allowing seawater to penetrate into the subsea pipeline system to which the valve is connected, or allowing the fluid carried by the pipeline to flow out. This can be achieved by means of a structurally simple ball valve without the need for said valve being covered or protected against the surrounding medium by any additional means. In addition, the ball valve, according to present invention, is simple to assemble/dismantle and is inexpensively obtained and maintained.

These objects are achieved by the ball valve according to the present invention by the distinguishing features indicated in the following disclosure.

In accordance with the present invention, the internal vital components of the ball valve, for instance the ball/stem, packings, packing seats, actuators, bearings, etc., can be inspected, overhauled, repaired and replaced while the valve is in a submerged position without having seawater penetrate into said pipeline to which the valve is connected, or the medium in the pipeline from leaking out into the surrounding seawater. When the valve is open and in a normal operating condition, the internal vital components are separated from the flowing medium in said pipeline by means of a tight barrier and are, therefore, effectively protected against harmful influence from the flowing medium and/or contaminations and particles contained in the flowing medium. A considerably improved environment is therefore provided for the vital parts of the valve, compared to the environment of previously known ball valves for the present purpose, vital parts being accessible for maintenance without the use of complicated and expensive protection equipment. The invention represents, therefore, a considerable technical improvement regarding lifetime and functional safety for ball valves in subsea applications and similar applicable areas.

According to the invention, the internal sleeves are guided through the valve; namely, from one opening in the valve housing through the ball to the second opening in the valve housing, and said sleeves form a tight, continuous passageway through the valve when open. The valve ball is sectioned into two and the tightening parts and the stem/actuator are provided on the upper ball member and the internal sleeves in the lower ball member. The two ball members are loosely connected to each other and form, in an assembled state, a ball/stem device which is mounted/guided towards the valve housing and bonnet. When the valve is open, the upper ball member which is provided with tightening parts long with the stem/actuator can be dismantled by being withdrawn vertically out of the valve housing, while the lower ball member with the internal sleeves will be left behind in the valve housing. By dismantling the valve in this manner, most of the valve's vital components will become available for inspection, control, overhauling, repair and replacement.

More specifically, the valve ball assembly according to the present invention comprises two axially withdrawable internal sleeves that, when the valve is open, can be pushed outwards for engagement with guiders in the valve housing; thereby forming a tight, continuous passageway from one opening in the valve housing through the ball assembly to a second opening in the valve housing, which can be pushed inwards into a position where said sleeves pass clear of its guiders when the ball assembly rotates during closing of said valve. Preferably, actuators transfer mechanism for moving of the internal sleeves which, when the valve is in an open position, will enable the formation of said tight, continuous passageway, main packings, main packing seats, mounting for the ball assembly, etc., can be placed in the valve housing in such a manner that these, when the valve is open and in normal position, are located on the outside of the said tight, continuous passageway through the valve and, therefore, are protected from the harmful action of the flowing medium in the pipeline to which said valve is connected. The upper and lower ball member can suitably be joined by means of a cylindrical coaxial guiding with a stem axis and/or by means of plane guiding surfaces/guiding grooves running parallel to the stem axis, and can be mounted/guided axially and radially in one unit in the bonnet of the valve housing and the valve housing itself.

Inspection, overhauling, repair and replacement of vital parts, such as main packings and seats for these, can take place any time without operational interruption and without leakage out of or into the pipeline.

The preferred embodiments of the invention will be explained in more detail in the following description with reference to the drawing showing non-limiting examples of the embodiments and use of the invention, where the two main varieties comprise a "mechanically operated" variant (FIGS. 1–11) and a "hydraulically operated" variant (FIGS. 12–19). The meaning of these designations and designs of the two main varieties is described in the following description.

Components, having similar functionality in the two variants are, in the drawings and description, designated by the same reference number, even if said components are occasionally not of identical shapes.

In FIGS. 1–4 the ball is shown in an open position and the two internal sleeves are shown in an operational position; wherein, FIG. 1 shows a longitudinal section through the stem axis; FIG. 2 is a horizontal elevation (valve cover is removed) with a horizontal section through the axis of said passageway;

Figure 1:
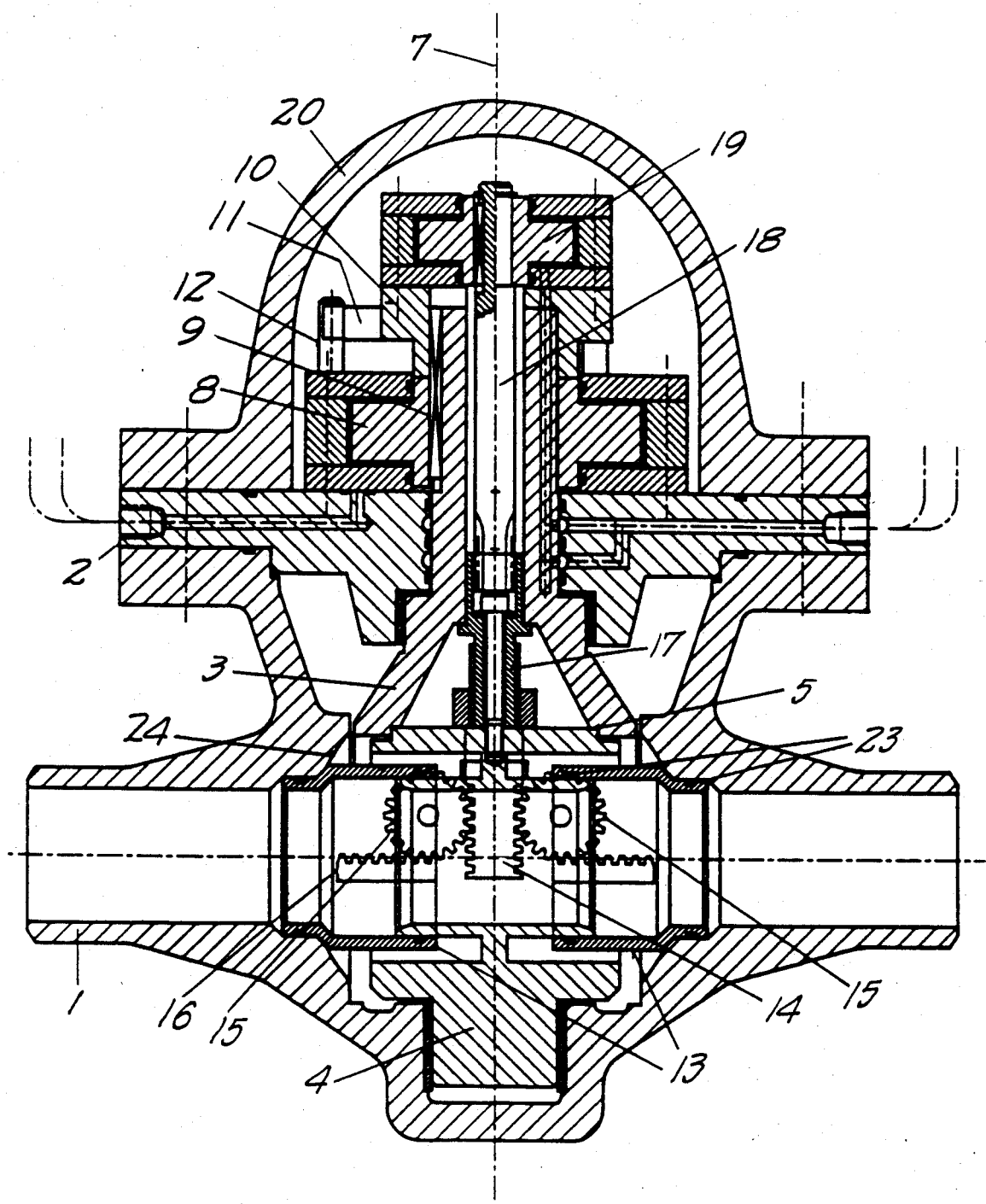
Figure 2:
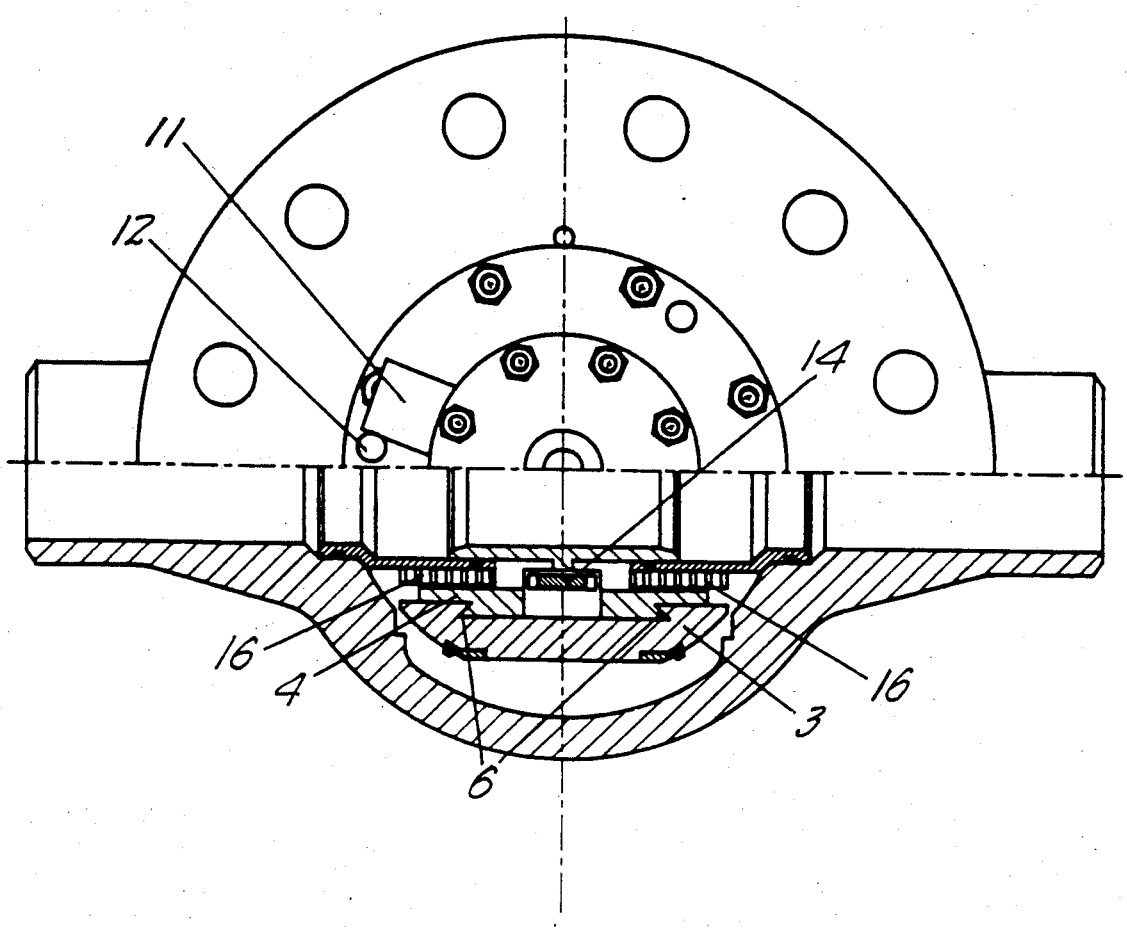
Figure 3:
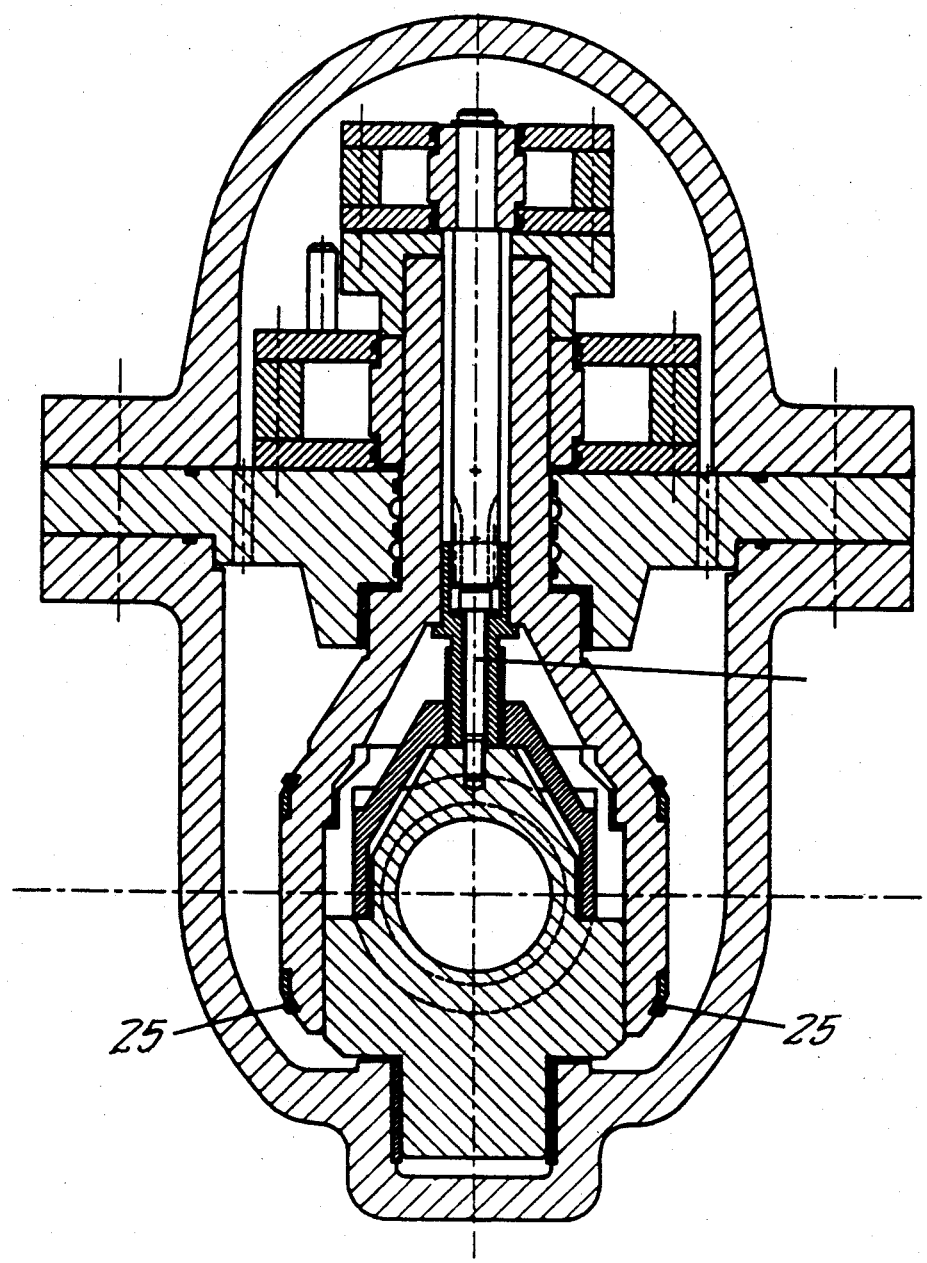
FIG. 3 is a cross section through the stem axis.
Figure 9:
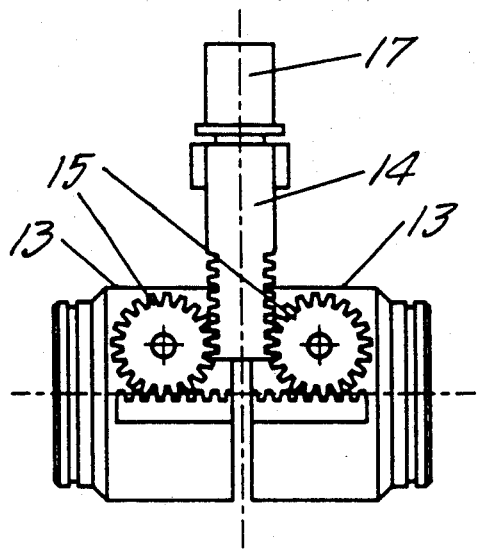
Figure 4:
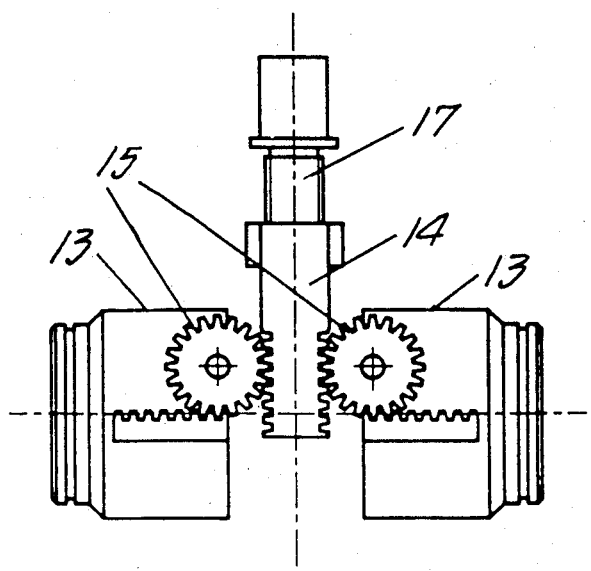
FIG. 4 shows the internal sleeves in operational position, shown in side elevation.
Figure 6:
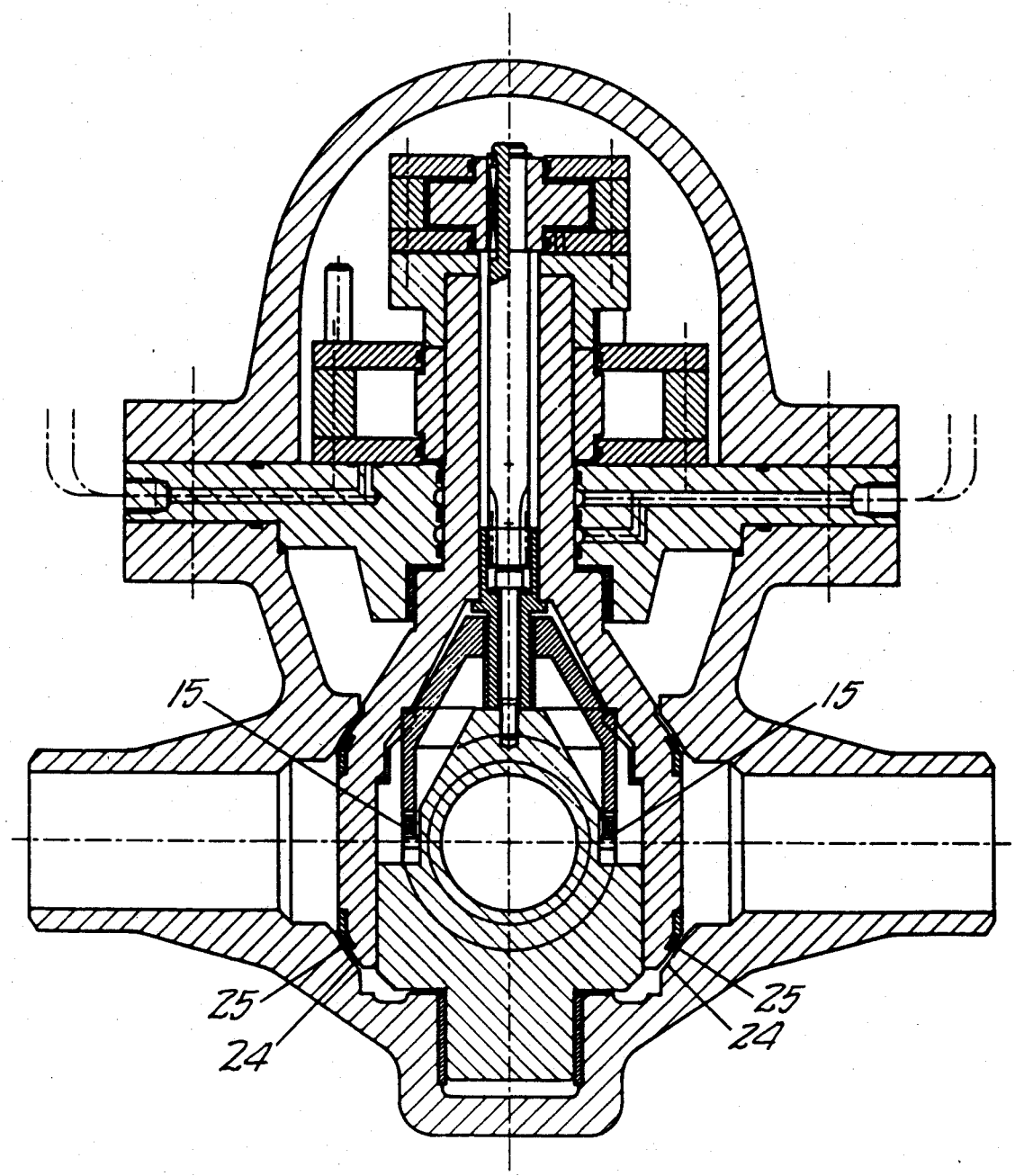
Figure 7:
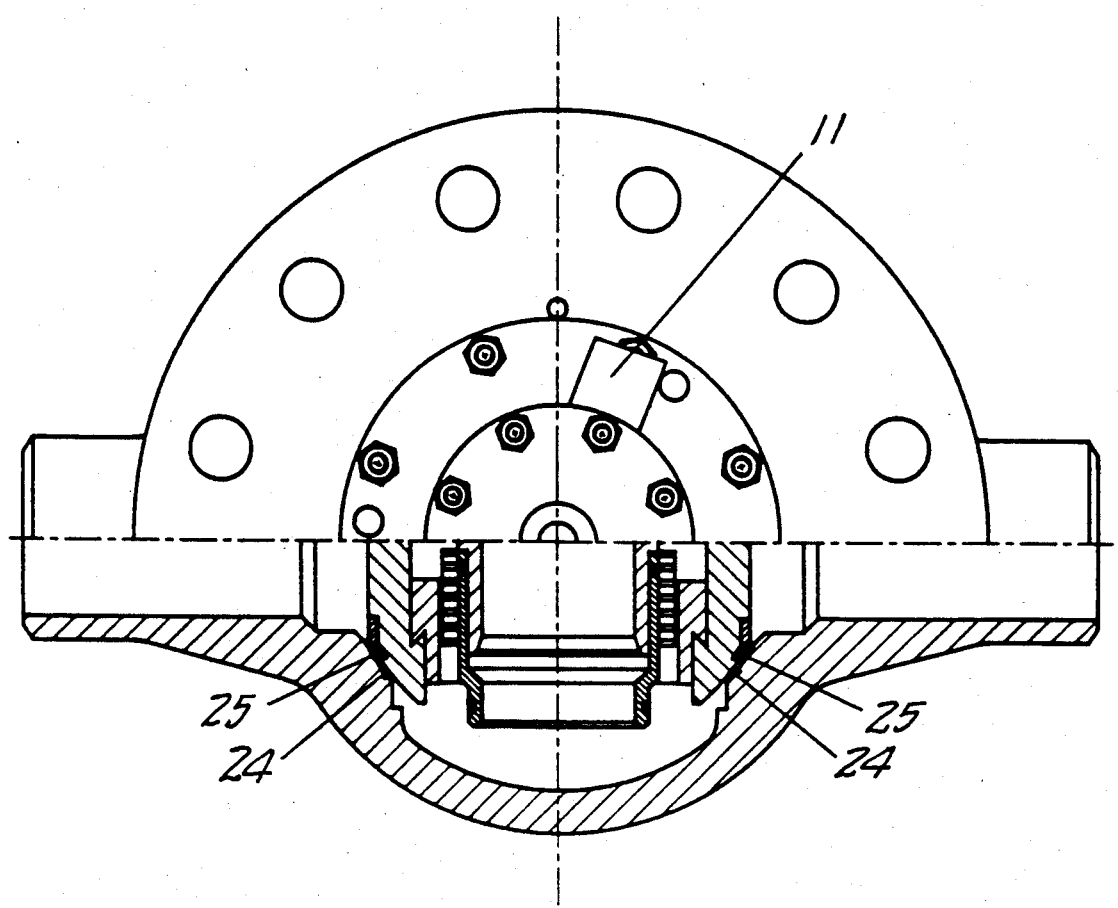
Figure 8:
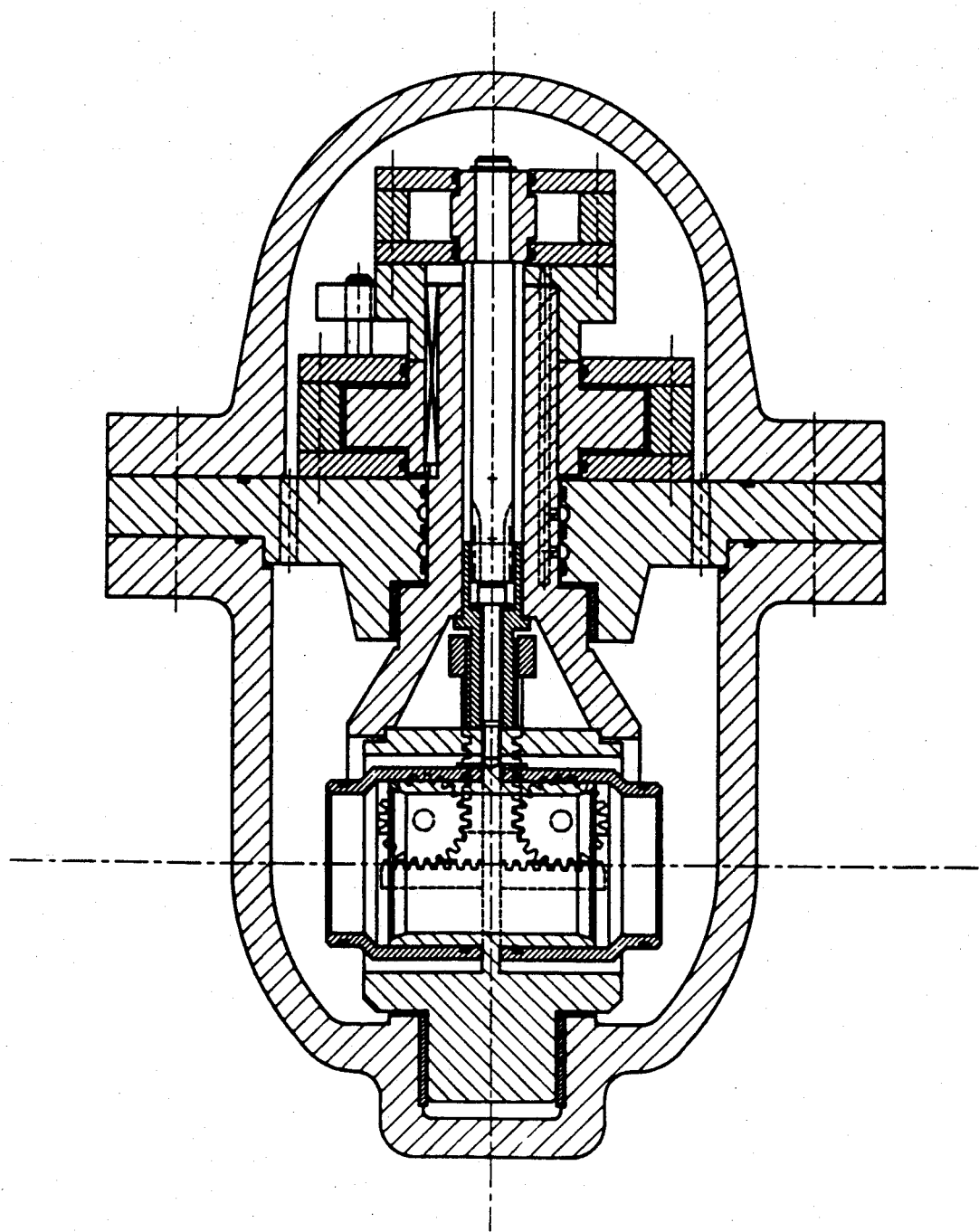

In FIGS. 6–9 the ball is in closed position, while the sleeves are in a retracted position; wherein, FIG. 6 shows a section corresponding to FIG. 1;

FIG. 7 is an elevation/section corresponding to FIG. 2;

FIG. 8 is a section corresponding to FIG. 3;

FIG. 9 is a section corresponding to FIG. 4.

Figure 10:
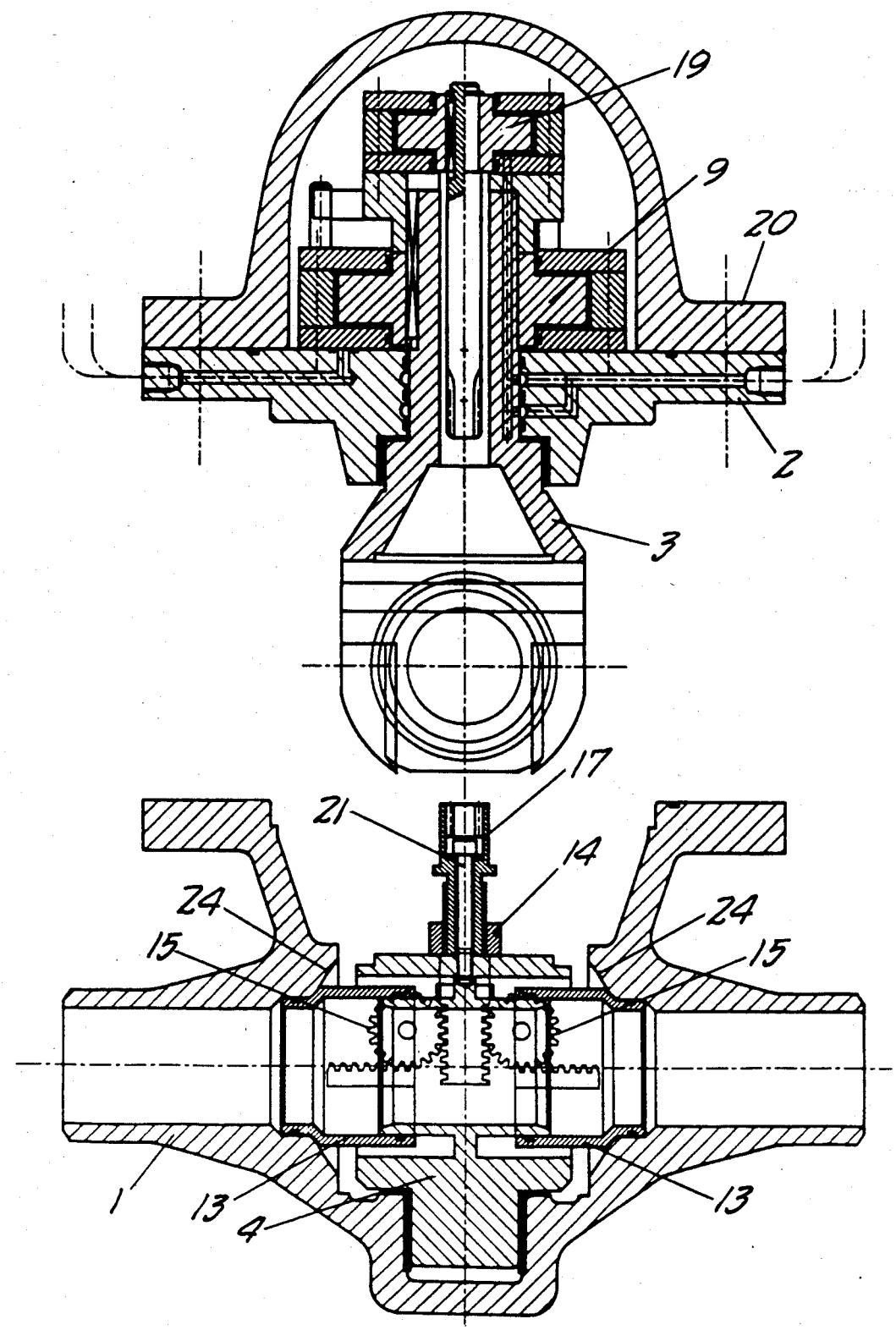
Figure 11:
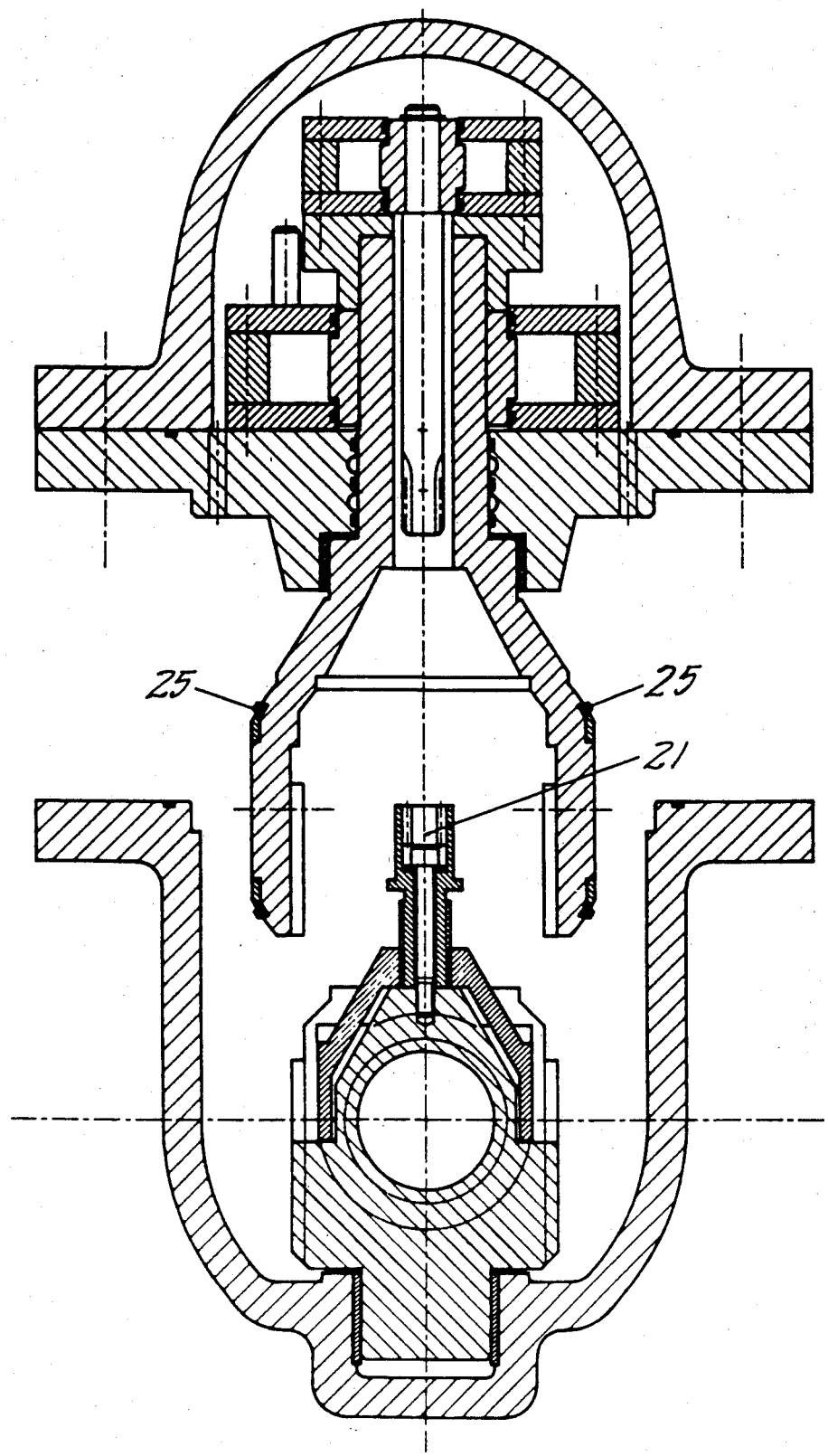

In FIGS. 10 and 11 the upper ball member with a valve cover, valve housing bonnet and actuators are dismantled, while the sleeves and lower ball member are in an operative position; while, FIG. 10 is a section corresponding to FIG. 1;

FIG. 11 is a section corresponding to FIG. 2.

As earlier stated, the previous figures concern the mechanically operated variant of the invention. The following FIGS. 12–19 concern, on the other hand, the hydraulically operated variant.

Figure 12:
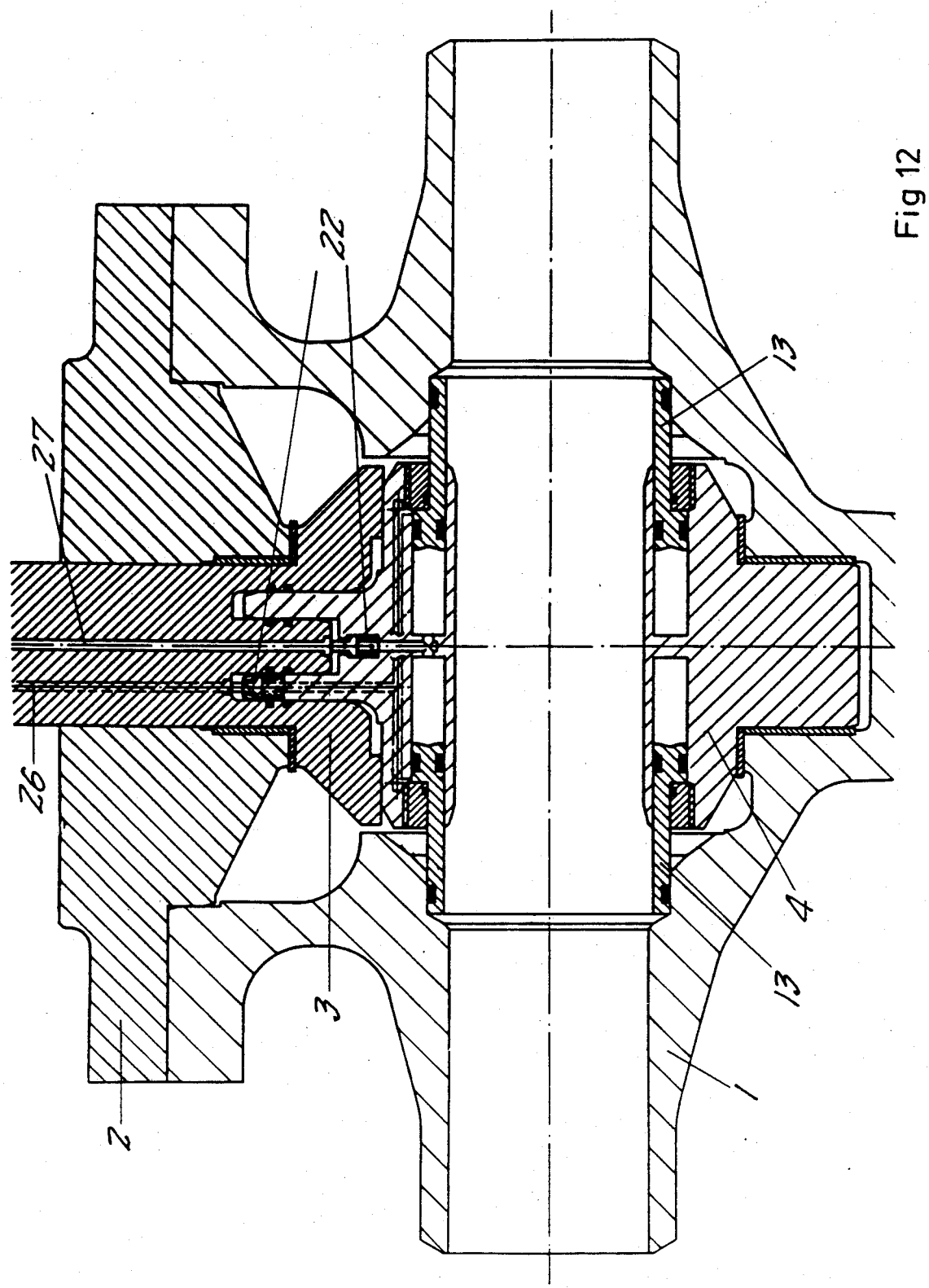
Figure 13:
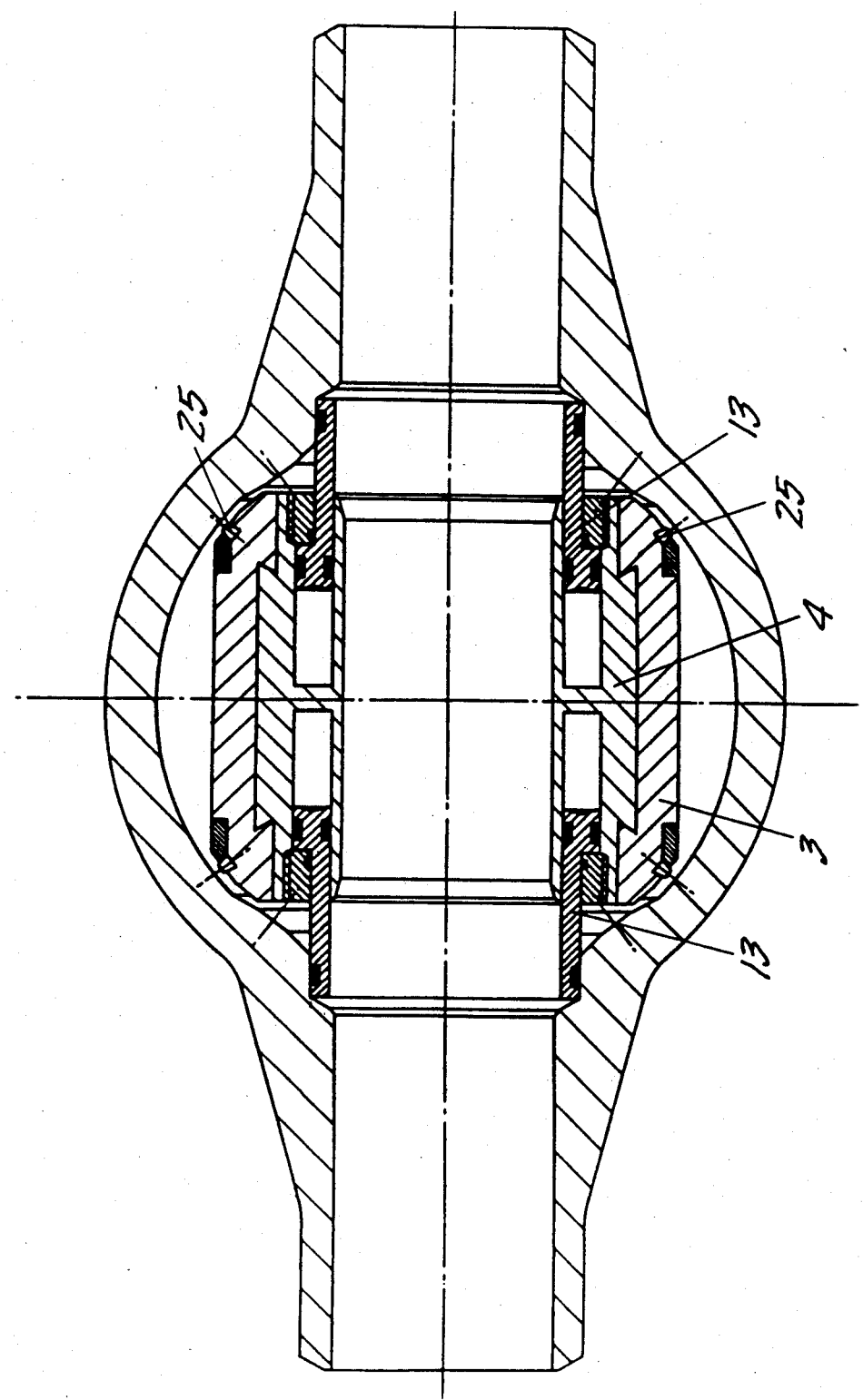
Figure 14:
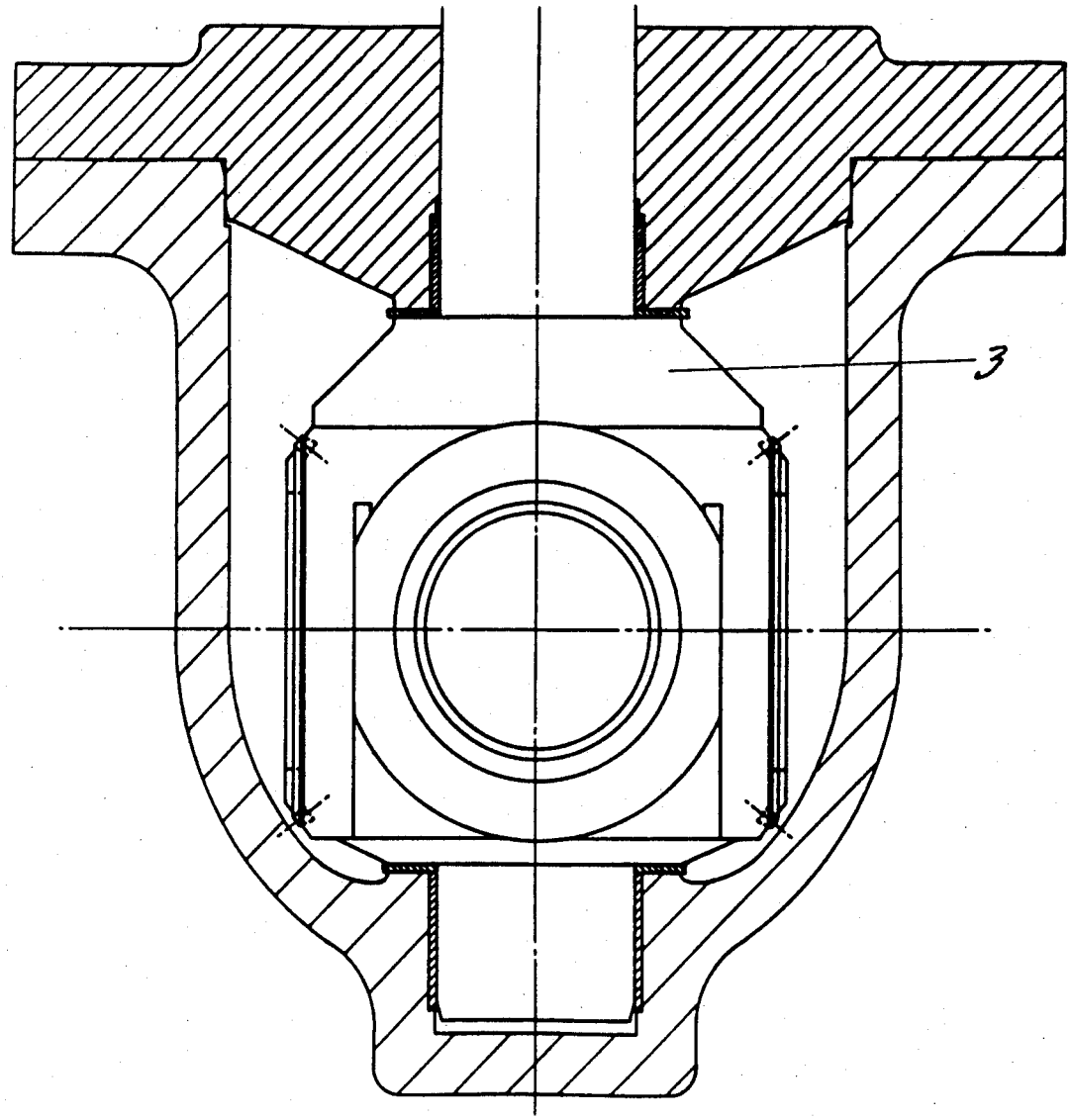
Figure 15:
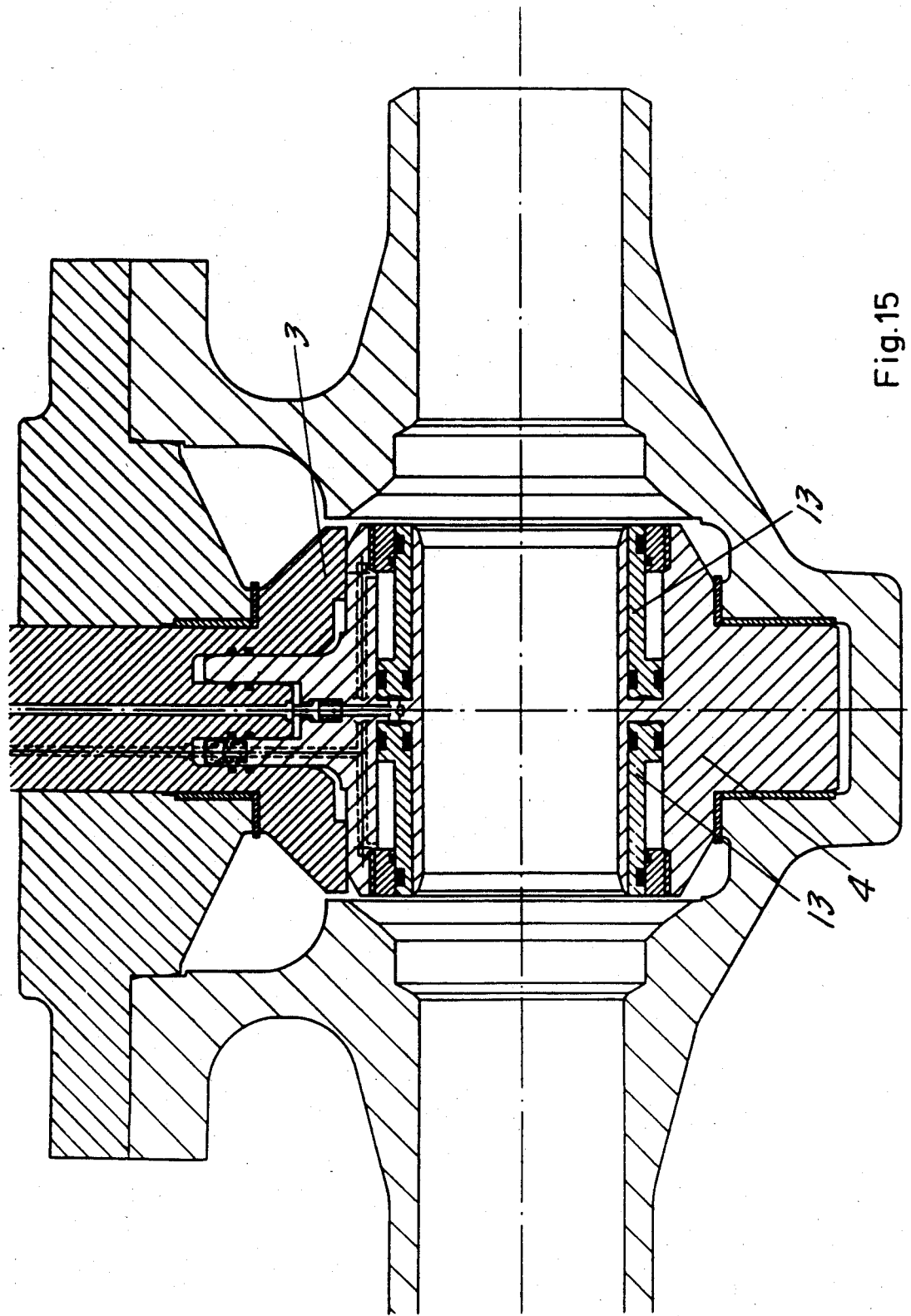
Figure 16:
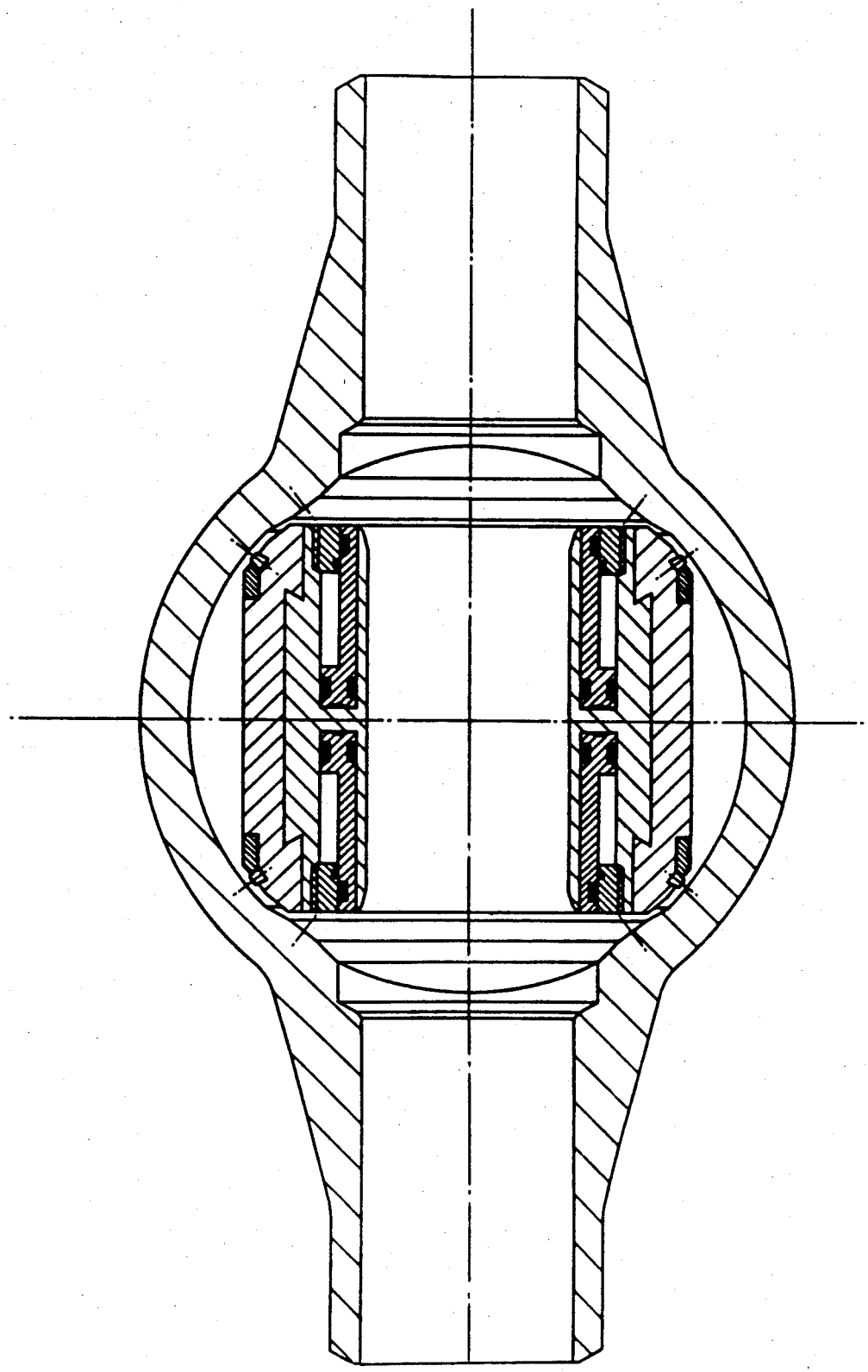

In FIG. 12-14 the ball is in an open position, while the sleeves are in an operative position, in which:

FIG. 12 shows a longitudinal section through the stem axis;

FIG. 13 is a horizontal section through the passageway axis;

FIG. 14 is a cross section through the stem axis;

In FIGS. 15 and 16 the ball is in an open position and the sleeves are in a retracted position; while, FIG. 15 shows a longitudinal section through the stem axis;

FIG. 16 is a horizontal section through the passageway axis.

Figure 17:
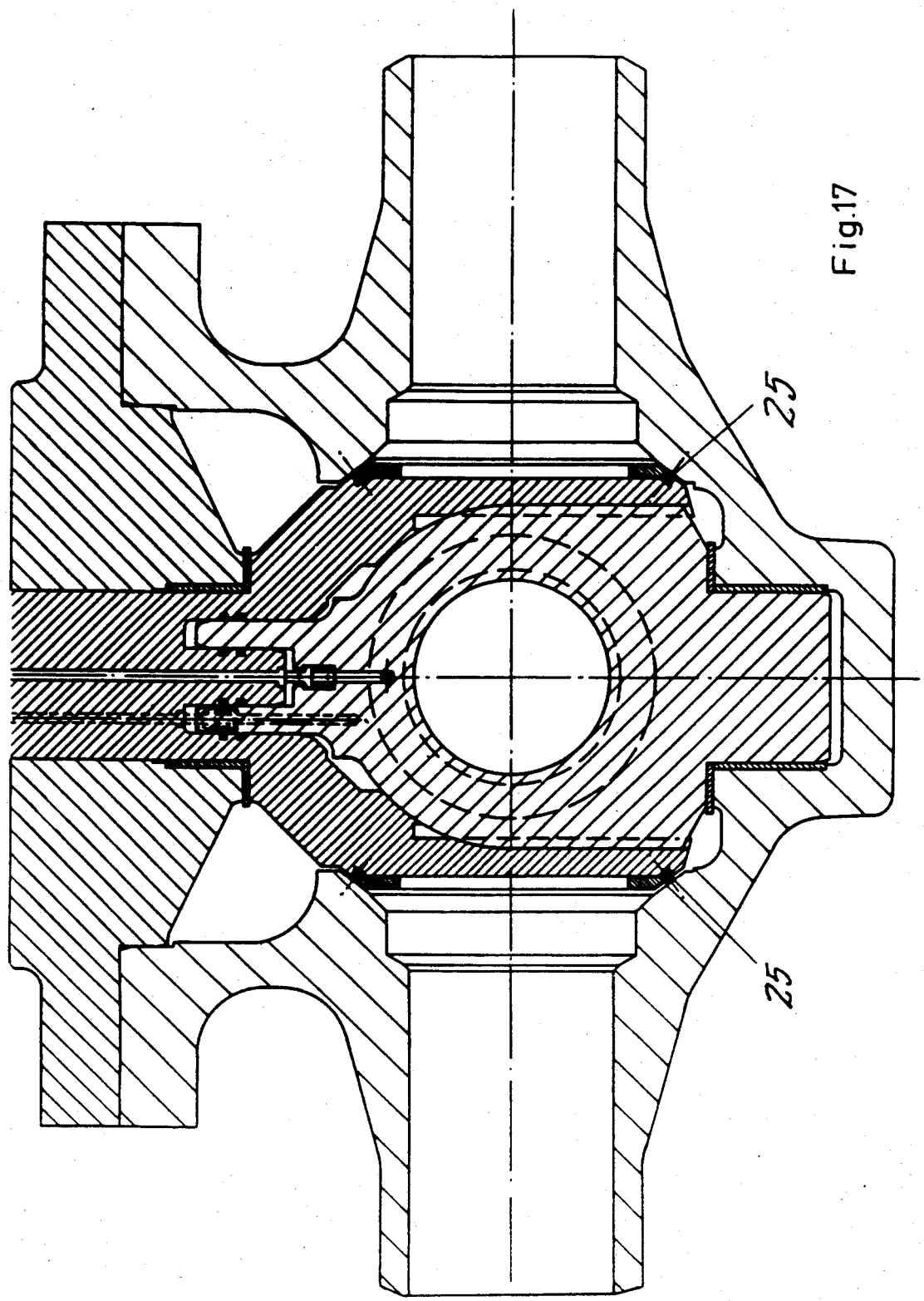
Figure 18:
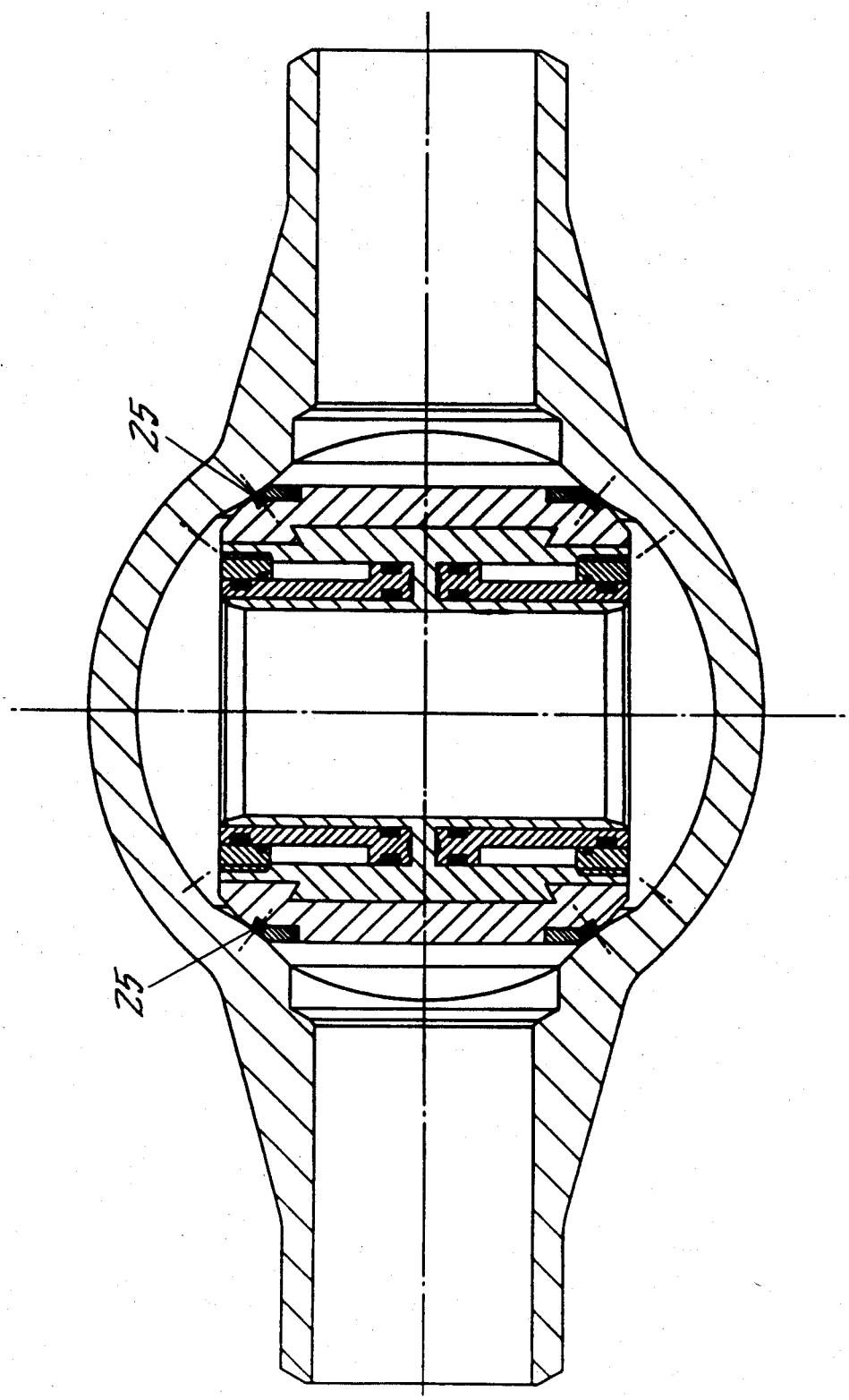

In FIGS. 17 and 18 the ball is in a closed position, while the sleeves are in a retracted position, in which:

FIG. 17 shows a longitudinal section through the stem axis;

FIG. 18 is a horizontal section through the passageway axis.

Figure 19:
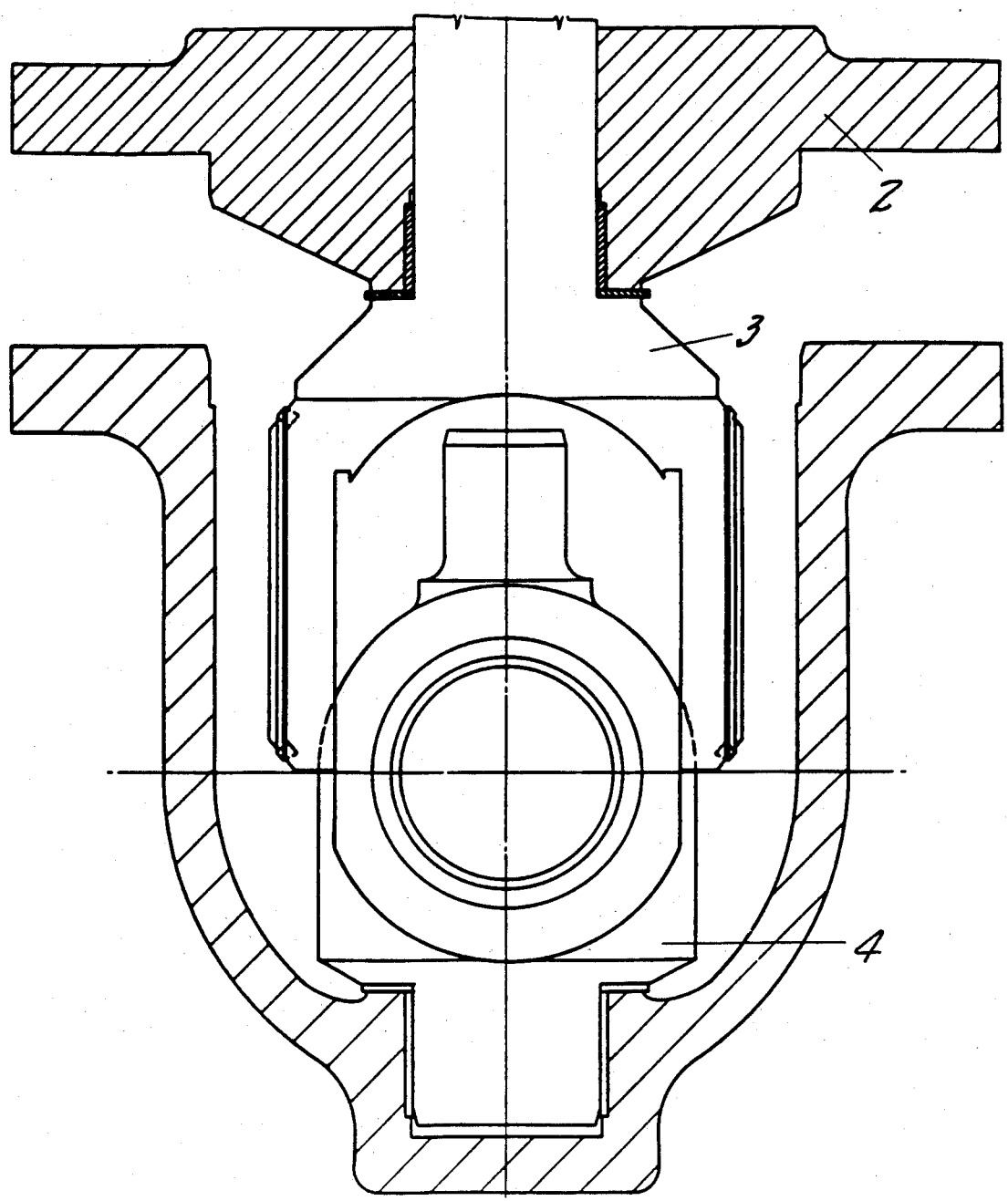

FIG. 19, which shows a cross section through the stem axis, and where the section is placed on the outside of the stem and the ball, the upper ball member with a valve cover, valve housing bonnet and actuator is dismantled, while the lower ball member with sleeves is in an operative position.

The valve comprises a valve housing 1 with a lid or so-called bonnet 2, and a valve cover which controls and surrounds the moving and tightening components of the valve.

The ball assembly comprises an upper ball member 3 in which the stem is mounted and guided in the valve housing bonnet 2. The upper ball member 3 is connected to the lower ball member 4 by means of a cylindrical control member 5 which is coaxially arranged relative to the stem axis and by means of guide faces 6 which is arranged parallel to the stem axis 7. The lower ball member 4 is in its lower end mounted/guided in the valve housing 1.

The upper and lower ball members 3 and 4 form together a ball/stem arrangement which is mounted/guided axially and radially, respectively, in the valve housing 1 and bonnet 2. This ball assembly can rotate around the stem axis 7, which can be carried out either manually or, as shown in the drawings, by means of an actuator, hereafter called a ball actuator 8. The ball actuator 8 shown is of the hydraulic wing rotor type, but other known actuator types can be employed in order to carry out the same operation. The casing of the ball actuator 8 is rigidly secured to the valve housing bonnet 2, and its rotor is rigidly connected, shown as a key joint 9, to the upper ball member 3 of the ball arrangement.

In the same way, a hub 10 is rigidly secured to the stem of the upper ball member 3. This hub 10 is provided with a crank 11 which, together with a gudgeon 12, forms a swing limit for the rotation of the ball actuator 8 of the ball assembly. This is necessary to ensure a correct positioning of the ball assembly in relation to said valve housing 1 when the following operations are to be carried out:

The sleeve 13 is guided by means of its internal circumference against the body in the lower ball member 4 and can be moved backwards and forwards along its own axis by means of a suitable device. In this variant, which is previously designated as the mechanically operated variant, these movements are carried out mechanically; namely, by means of a rack 14 and two pairs of gear wheels 15 which are mounted on the lower ball member 4 and engage a rack-shaped part 16 on each side of said sleeves 13. The top of the rack 14 is shaped as a nut which engages a screw 17. The screw 17 is mounted axially and radially relative to the upper and lower ball members respectively 3 and 4, and is moreover connected to an axle 18 via a key joint that is axially withdrawable. The axle 18 is rigidly connected to the rotor in an actuator, hereafter called sleeve actuator 19, of which its external housing is rigidly connected with the hub 10 on the stem of its upper ball member 3.

Figure 5:
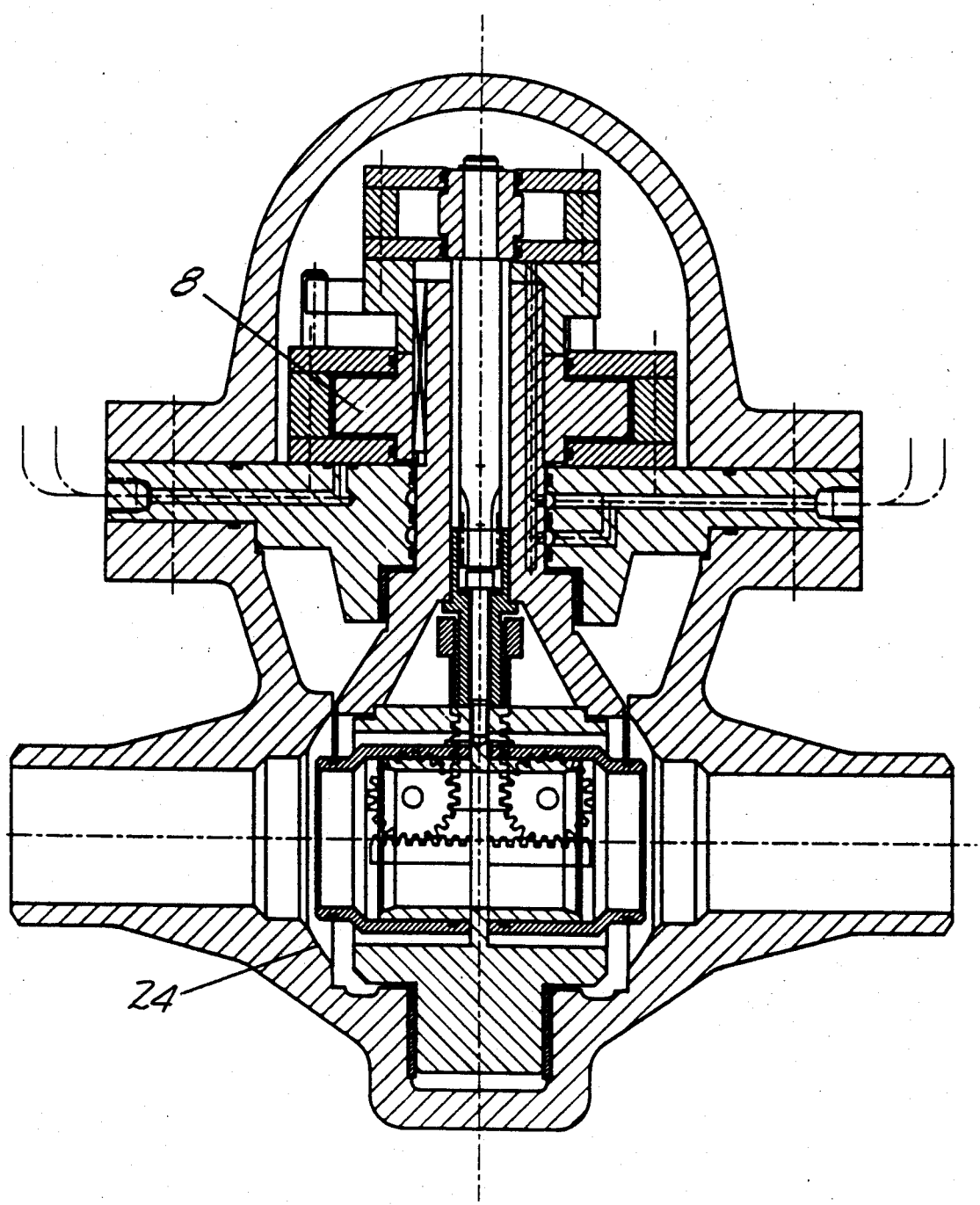
FIG. 5 shows the ball in an open position and the sleeves in a retracted position, viewed in a section corresponding to FIG. 1.

The sleeve actuator 19 serves to rotate the axle 18 and screw 17 relative to the ball assembly causing, via the pitch of thread on the screw 17 and the rack 14, the rack 14 to move up and down in the direction of the stem axis 7. As previously mentioned, this movement is transferred via the gear wheels 15 to the sleeves 13, so that these move backwards and forwards along their axis, either outwards to the operative position (see FIG. 1), or inwards to the retracted position (see FIG. 5). To make things clearer, the sleeve 13, gear wheel 15, rack 14 and screw 17 are shown withdrawn from other components in FIGS. 9 and 10.

Other known forms of mechanical transmitters, for example rocker arms, links, articulated cranks, chains/chain wheels, etc., can be employed; however, it does not seem necessary to describe these embodiments here in detail. The valve design, according to present invention, exhibits several advantageous features which will be described in more detail below.

FIGS. 1-3 show the valve in an open position and in normal operation. The sleeves 13 are in their outer position, in operating position, providing a leakage free connection via packings 23 between the lower ball member 4 and the openings in the valve housing 1.

The sleeves, therefore, contribute to form a continuous, tight passageway through the valve, where the flowing medium is completely separated from other cavities of the valve, where the valve's vital, movable parts are to be located. The valve's main packings 25, packing seats 24, bearings, actuators, etc., are, therefore, efficiently protected against the destructive influence of the flowing medium in said pipeline. This feature of the present invention makes it possible, among other things, to fill the remaining cavities of the valve, outside of the passageway, with a suitable lubricating/preserving material that contributes to additional improvement of the environment for the vital parts of the valve and, therefore, ensures the optimal function of the valve.

The invention exhibits further the advantageous features that enable a number of the valve's vital components to be dismantled/replaced while the valve is in normal operation, i.e. without having to shut down the pipeline to which the valve is connected and without having leakage into or out of the pipeline system. This is achieved by means of the mentioned ball arrangement incorporating the upper member 3 which is loosely connected with the lower ball member 4. The upper ball member 3, together with the valve housing bonnet 2, valve cover 20 and actuators 8, 19, can be detached from the remaining components of the valve and be lifted up into the direction of the stem axis 7. This approach for dismantling is shown in FIGS. 10 and 11, where it is clearly evident that the lower ball member 4 with sleeves 13, rack 14, gear wheels 15 and screw 17 stays in operative position and forming a continuous, tight passageway through the valve housing 1. The screw 17 is required to be self-locking against rotation when it is axially loaded and to remain fixed in the axial direction in this state by means of an cap-bolt 21, so that the gear wheel mechanism 14, 15 can resist any possible axial force on the sleeves 13 caused by an internal pressure in the pipeline to which the valve is connected. The sleeves 13 are thereby effectively secured against any unintended displacement causing leakage during the previously mentioned dismantling operation.

Axial forces on the sleeves 13, caused by internal pressure, can be reduced/eliminated by making the sleeves 13 graduated, which ensures complete or partial equalization of the axial directed pressure force. FIG. 1 shows a sleeve design which provides total balance of pressure forces.

During the previously mentioned dismantling, the valve's main packings 25 become accessible for inspection/replacement. Furthermore, it is by means of suitable facilities to inspect and cleanse the seats 24.

Below is a short explanation of the valve's mode of operation during closing.

When in an open position (FIG. 1) the following will happen: The sleeve actuator 19 is operated to make the sleeves 13 retract as previously explained. The sleeves 13 retract into the lower ball member 4, thereby enabling the sleeves to pass the seats 24 in the valve housing unhindered before the ball arrangement starts rotating, see FIG. 5. Thereafter, the ball actuator 8 is activated, causing the ball arrangement to rotate by 90 degrees, leaving the main packings 25 for closing of the valve seats 24 in said valve housing 1. This situation is shown in FIG. 7-9.

When the valve is opened, the previously described sequences take place in an inverted order.

The embodiment of the invention, which is previously called the hydraulically operated variant, deviate from the mechanically operated variant only in the mode by which the sleeves 13 are operated. With reference to FIGS. 12-19, this hydraulically operated variant will be described in more detail. In these figures the ball arrangement 8 and the valve cover 2 are omitted.

The mechanism for operating the sleeves 13 is eliminated, thus each of the sleeves 13 are formed as an annular piston which by a known method is moved backwards and forwards along its own axis, affected by fluid pressure, for example, oil under pressure. This fluid pressure is supplied through conduits 26, 27, respectively in its upper ball member 3 and lower ball member 4 to each side of the annular piston created by the sleeve 13. The sleeve 13 forms, therefore, an integrated part of a linear working piston actuator which can be regarded as a counterpart to the sleeve actuator 19 in the mechanically operated valve variant.

When dismantling the hydraulically operated variant in its operating position (FIG. 9), the sleeves 13 become secured against unintended axial displacement as a result of the pressure force from the flowing medium by having the bores or the oil conduits 26, 27 provided with locking valves 22, which are arranged to shut off automatically when the upper ball member 3 is lifted up. The enclosed oil volume prevents thereby the sleeves from moving.

Moreover, all operating procedures, such as the opening-and closing sequences, dismantling, inspections, reparation possibilities, etc., are the same for the two main variants of the invention, and the hydraulically operated valve variant exhibits, therefore, the same advantageous features which are described previously for the mechanically operated valve variant.

What is claimed is:

1. A ball valve comprising:
   (a) a housing having an upper housing and a lower housing, said lower housing having an inlet and an outlet;
   (b) an upper ball member rotatably mounted in said upper housing, said upper ball member rotatably movable between an open position where said valve is open and a closed position where said valve is closed;
   (c) a lower ball member rotatably mounted in said lower housing, said lower ball member having a port therethrough along a longitudinal axis, said lower ball member in releasable engagement with said upper ball member such that said lower ball member rotatably moves with said upper ball member between said open position and said closed position;
   (d) a first sleeve slidably mounted in said lower ball member, said first sleeve having a port therethrough along said longitudinal axis, said first sleeve movable between a first position where said first sleeve is in engagement with said inlet of said lower housing and a second position where said first sleeve is withdrawn within said lower ball member;
   (e) a second sleeve slidably mounted in said lower ball member, said second sleeve having a port therethrough along said longitudinal axis, said second sleeve movable between a first position where said second sleeve is in engagement with said outlet of said lower housing and a second position where said sleeve is withdrawn within said lower ball member;
   (f) a ball actuator means for moving said upper ball member and said lower ball member between said open position and said closed position, said ball actuator means mounted in said upper housing and connected to said upper ball member;
   (g) a sleeve actuator means for moving said first and second sleeve between said first position and said second position, said sleeve actuator means housed in said upper housing and releasably connected to said first and second sleeve through said upper ball member;
   (h) said first position being such that said upper and lower ball member are in said open position, a tight continuous passageway is formed between said inlet and said outlet, and such that said upper housing, said upper ball member, said ball actuator means and said sleeve actuator means are removable as a single unit while, said lower ball member and said first and second sleeve remains within said lower housing thereby allowing for inspection and maintenance while in such open position; and
   (i) said second position being such that said first and second sleeve are withdrawn within said lower ball member and said ball actuator means can move said upper and lower ball member between said open position and said closed position.

2. The valve of claim 1 wherein said upper ball member has a stem that connects said upper ball member to said ball actuator means, and said lower ball member engages said upper ball member by means of a cylindrical control member and a guideface, said stem, cylindrical control member and said guideface being coaxial.

3. The valve of claim 1 wherein said first sleeve is connected to a first gear wheel, said first gear wheel being housed in said lower ball member; said second sleeve is connected to a second gear wheel, said second gear wheel being housed in said lower ball member, and a rack mounted in said lower ball member in engagement with said first and second gear wheel and releasably connected to said sleeve actuator means.

4. The valve of claim 1 wherein said first and second sleeve are tapered at an end for engagement with said inlet and outlet respectively.

5. The valve of claim 1 wherein said sleeve actuator means is connected to said first and second sleeve by hydraulic means.

6. The valve of claim 1 further comprising a locking valve such that said first and second sleeve are locked in said first position when said upper ball member is lifted out of said housing.

7. The valve of claim 3 wherein the rack has a top shaped like a nut and releasably engages a screw which is connected to said sleeve actuator means thereby allowing said sleeve actuator means to be in releasable engagement with said first and second sleeve.

* * * * *